United States Patent [19]
Aboutboul et al.

[11] 3,794,713
[45] *Feb. 26, 1974

[54] PREPARATION OF SILICA GELS
[75] Inventors: Henri A. Aboutboul, Brussels, Belgium; Jerome H. Krekeler, Cincinnati, Ohio; William Kirch, Clinton, Iowa
[73] Assignee: National Petro Chemicals Corporation, New York, N.Y.
[*] Notice: The portion of the term of this patent subsequent to Mar. 27, 1989, has been disclaimed.
[22] Filed: Oct. 26, 1971
[21] Appl. No.: 191,978

Related U.S. Application Data
[63] Continuation-in-part of Ser. No. 750,734, Aug. 6, 1968, Pat. No. 3,652,215.

[52] U.S. Cl............... 423/338, 423/339, 423/335, 252/451
[51] Int. Cl............................................. C01b 33/16
[58] Field of Search..... 423/338, 339, 335; 252/451

[56] References Cited
UNITED STATES PATENTS

| | | | |
|---|---|---|---|
| 2,699,376 | 1/1955 | Hay | 423/335 |
| 2,700,061 | 1/1955 | Owen | 252/62 X |
| 2,731,326 | 1/1956 | Alexander et al. | 423/338 |
| 2,763,533 | 9/1956 | Ashley | 423/330 |
| 2,765,242 | 10/1956 | Alexander et al. | 106/288 X |
| 2,785,051 | 3/1957 | Miller | 423/338 |
| 3,041,140 | 6/1962 | Alexander | 423/335 |
| 3,081,154 | 3/1963 | Acker et al. | 423/339 |
| 3,367,742 | 2/1968 | Marotta et al. | 423/335 |
| 3,403,109 | 9/1968 | Colgan et al. | 252/451 |
| 3,428,425 | 2/1969 | Marotta | 423/339 |
| 3,433,593 | 3/1969 | Reinhardt et al. | 423/339 |
| 3,453,077 | 7/1969 | Hyde | 423/338 |
| 3,337,299 | 8/1967 | Burke, Jr. | 423/332 |

Primary Examiner—Edward Stern
Attorney, Agent, or Firm—Allen A. Meyer, Jr.

[57] ABSTRACT

Silica xerogels having narrow pore diameter distribution in the range of 300 – 600 A, surface areas in the range of from 200 – 500 $m^2/g$, and pore volumes in the range of 2.0 – 3.5 $cm^3/g$ and process for preparing such silica xerogels comprising critically controlled steps of precipitation of the silica gel, aging the precipitated silica hydrogel slurry, washing the aged product, displacing the water with an organic liquid substantially completely miscible with water and drying the gel.

30 Claims, 6 Drawing Figures

PREPARATION OF SILICA GELS

This application is a continuation-in-part of U.S. application Ser. No. 750,734, filed Aug. 6, 1968 and now U.S. Pat. No. 3,652,215.

BACKGROUND OF THE INVENTION

1. Field of the Invention

This invention relates to silica xerogels having a narrow pore diameter distribution in the pore diameter range of 300 – 600 A, surface areas ranging from 200 – 500 m²/g and pore volumes of from about 2.0 to about 3.5 cm³/g and to a process for preparing such silica xerogels.

2. Description of the Prior Art

Much of the technology in the area of silica gels involves the problem of making strong hard gel masses which will not shrink and crack upon being dried. The gels are useful as absorbents and catalyst bases. Gels of small particle size and narrow particle size distribution, about 50 microns mean diameter, have been found to be the most desirable for fluid bed or stirred reactor catalyst operations because they are more easily fluidized, reduce the amount of erosion of equipment and suffer less degradation by abrasion and particle rupture.

The only silica gels thus far reported having suitable particle size and narrow particle size distribution for the purposes mentioned above are characterized by a maximum pore volume of about 1.8 to 1.9 cm³/g and surface area of from about 250 – 350 m²/g. Silica gels having higher average pore diameters reported in the prior art have only been obtained as aerogels. Aerogels are subject to shrinking when they are wet due to coalescence of the ultimate particles. This produces a loss of porosity and makes the products unsatisfactory for certain uses, especially as polymerization catalysts.

SUMMARY OF THE INVENTION

The present invention provides silica xerogels having a narrow pore diameter distribution primarily in the range of from 300 – 600 A, surface areas ranging from 200 – 500 m²/g, pore volumes of from 2.0 to about 3.5 cm³/g, and stability at temperatures of up to about 2,000°F. in a fluidized bed. The invention further contemplates a process for preparing the foregoing silica xerogels which comprises the following steps:

1. Precipitation of a silica gel by reaction of a water soluble silicate to precipitate the silica therefrom, e.g., by neutralization of an aqueous alkaline silicate solution, most preferably, $xNa_2O \cdot ySiO_2$, with a strong acid, a weak acid such as $CO_2$, ion exchange resins or by any other suitable neutralization procedure, carried out in about stoichiometric proportions under good agitation, e.g., high shear agitation. The primary criterion which any silica source must exhibit to be useful in the present process is that it must permit the silica to be introduced into the aqueous system in the form of a water soluble silicate which can yield very small dense particles of silica which gel or precipitate to yield the hydrogel. For instance, a water soluble alkaline silicate such as a sodium silicate can be neutralized by a controlled acid addition, e.g., with sulfuric acid to yield very small dense particles of silica which in turn gel to give the hydrogel. The acid neutralization will also yield an acid-base salt, for instance sodium sulfate from the neutralization of a sodium silicate with sulfuric acid. A part of such a salt becomes entrapped in the hydrogel during precipitation and must be washed therefrom as described in step 3.

For commercial use, water soluble silicates are commonly available as alkaline silicates, including the sodium silicates, the potassium silicates, the crystalline quaternary ammonium silicates, the lithium silicates, etc. The sodium silicates are preferred as they are inexpensive and readily available at varying silicate contents, depending upon the producer. The following discussion will be in terms of the precipitation of the hydrogel from an aqueous alkaline silicate solution. The water soluble silicate selected must be such that precipitation is in accordance with the following conditions to provide a silica xerogel of the necessary parameters which is especially suited for use as a catalyst:

a. The $SiO_2$ concentration in the final slurry is between 5 and 12 percent by weight and preferably from about 8 to about 9 percent. Outside of this range, the gel cannot be preserved.

b. The neutralization medium is added at a rate such that the gel point is reached in from about 30 minutes to about 120 minutes, and preferably about 60 minutes, whereafter the remaining amount of the neutralization medium required to provide a pH as called for in step 1(d) is added. Usually up to about 40 percent of the required amount of the neutralization medium is added in from about 30 to about 120 minutes, whereafter the remaining about 60 percent or more of the neutralization medium is added. Since the neutralization is exothermic, the post-gel point addition of the balance of the neutralization medium should not be at a rate which causes the temperature to rise outside of the range specified in step 1(c). The post-gel point rate of neutralization medium addition should also not be so rapid as to cause large localized areas where the pH drops below the lower limit of the range specified in step 1(d). Typically, at least 20 minutes serves as a practical minimum time for post-gel point neutralization medium addition. Long addition periods can be used but are unnecessary so long as the above temperature/pH criteria are met. Preferably, the postgel point addition of the neutralization medium is accomplished in from about 20 to 90 minutes more, and preferably about 45 minutes more.

c. The temperature during precipitation is maintained between about 0° to about 17°C, preferably 0° to about 10°C and most preferably at about 5°C, and d. The pH during precipitation is from 3 to 8 and preferably between about 5 to about 7.

2. Aging the precipitated silica hydrogel slurry under the following conditions:

a. At a pH of from 3 to 8, preferably between about 4 and about 7, and preferably at a temperature between about 50°C and about 100°C, most preferably between about 90°C and about 95°C.

b. For a period of time sufficient to strengthen the fragile gel structure, preferably from 1 to about 6 hours and more preferably from about 2 to about 4 hours.

The aging of step 2 is necessary to strengthen the fragile gel, which will otherwise be destroyed during subsequent processing. It is critical during aging that:

1. the pH range be maintained in the range of 3 to 8; and
2. the pH, temperature and time be correlated in a very specific manner.

Amplifying upon the need for strict pH control, as the pH of the hydrogel slurry approaches 3 the qualities of the final gel begin to deteriorate and it is impossible to obtain a final gel of the desired properties. Thus, aging at a pH lower than the pH 3–4 range is prohibited. On the other hand, as the pH becomes too alkaline, the properties of the final gel also suffer. The upper pH limits can only be defined with an operating temperature. At the higher acceptable temperature levels, i.e., the 90°C+ range (considered most desirable since low temperatures significantly increase the required time), as the pH approaches 8 the properties of the final gel also suffer, and aging at a pH greater than the pH 7–8 range is prohibited. If the temperature of heat aging is decreased, the allowable pH of aging may be increased over the values stated.

With respect to the correlation of the pH, temperature and time, the following relationships have been established.

If the pH is lowered at constant temperature, the time of aging must be increased. If the pH is lowered at constant aging time, the temperature must be increased. Obviously, both time and temperature can be increased to obtain the same effect. The reverse is true for aging at higher pH's.

If pH is constant, lowering the temperature of aging requires longer aging times to be used and raising the temperature of aging requires shorter aging time to be used.

Considering the above factors, pH is usually the parameter held constant during the aging as variation from the described range destroys the gel. Operation will generally be in the pH 5 to 7 range to allow a safety factor between the pH limits of 3 to 8.

With the pH in the 5 to 7 range, the temperature is almost always maintained above 50°C and thus the preferred agings may be considered heat accelerated agings. While aging will proceed at much lower temperatures, at a pH of just above 3 and a temperature in the area of 17°C aging will take weeks, which is commercially unacceptable. While the maximum aging time and the minimum aging temperature are thus not overly critical per se, they must be appropriately correlated with pH.

3. Reducing the alkaline material concentration of the hydrogel by washing the hydrogel with a liquid which is capable of displacing the acid-base salt entrapped in the hydrogel during precipitation until the resulting wash liquor at equilibrium contains less than about 20 ppm (weight parts) of the alkaline material expressed as the acid-base salt. For the neutralization of a sodium silicate with sulfuric acid, less than 20 ppm sodium expressed as sodium sulfate, when the sodium in the product is in equilibrium with the wash liquor at room temperature, i.e., less than about 1,500 ppm (weight parts) sodium expressed as sodium sulfate in the dried gel. The product is then preferably washed with water if water is not the displacing liquid. For certain end uses, e.g., where the dry gel is to be calcined at high temperature, say 1,800°F, for activation as a catalyst base, it is preferred to wash to less than 1,000, more preferably 600 ppm (weight parts) of the alkaline material in the dried gel. Generally, the higher the calcination temperature the lower the amount of alkaline material permitted in the final gel. Preferred washing liquids are solutions of salts such as aluminum chloride or sulfate and ammonium chloride or nitrate. The displacing can also be accomplished by washing with an acid such as hydrochloric, sulfuric, or nitric acid or with water, though washing only with water is more time consuming. Dilute solutions of these acids must be used so the lower pH limit of 3 referred to previously not be exceeded, i.e., the pH does not fall below 3.

In those instances where the water soluble alkaline silicate has been neutralized with an ion exchange resin, it will, of course, be necessary to separate the hydrogel from the then alkaline form of the ion exchange resin.

4. Displacing the water from the gel by use of a water miscible liquid, e.g., a surfactant, an alcohol, a ketone or other water miscible organic compound which displaces water and has a lower surface tension than water, i.e., which will reduce the surface tension in the pores of the gel. The preferred alcohols are the lower aliphatic alcohols which contain less than about 6 carbon atoms, with the $C_1$ to $C_4$ monohydric alcohols being most preferred. The preferred ketones are acetone and methyl ethyl ketone, with the former being most preferred.

5. Drying the gel by conventional procedures, e.g., drying under vacuum at about 400°F. The amount of water miscible displacing organic liquid remaining after drying is not overly critical, as no matter when the liquid is removed it will exhibit a low surface tension on the silica gel. Generally speaking, however, most users will desire a dry silica gel product and little is gained by not removing substantially all of the water displacing organic liquid.

The above procedure (steps 1 to 5) provides a silica gel in accordance with the described parameters. However, many users will desire a silica gel of a particular particle size, e.g., one adapted to serve as a catalyst support for use in fluidized beds. Accordingly, one may wish to comminute or homogenize and reduce gel particle size by high shear mixing. This optional step may be done by high shear mixing the product from step 3 to obtain particles having a desired mean diameter for instance, a mean diameter of less than about 200 microns, preferably in the range of from 30 to 150 microns. If, however, good agitation is used during precipitation, e.g., high shear agitation, and careful pH, temperature and time control is maintained on the intermediate product during aging, usually but not necessarily combined with agitation during aging, a separate comminuting step can be omitted as the particles will have a mean diameter of less than about 200 microns.

A comminution or homogenization may be necessary in some instances where agitation is not carried out during the aging of step 2 and process conditions are not critically observed. In such a case, the required comminution may be carried out either prior to alkaline moiety displacement, intermediate alkaline moiety displacement and washing with the water miscible organic liquid or after both alkaline moiety displacement and washing with the water miscible organic liquid. It is preferred to comminute at a point no later than alkaline moiety displacement as small particles are much easier to wash.

DETAILED DESCRIPTION OF THE INVENTION

The invention will now be described in greater detail with reference to specific examples which illustrate the criticality of process conditions in order to obtain a silica xerogel product having a narrow pore diameter distribution primarily in the range of from about 300 to about 600 A, a surface area in the range of from 200 – 500 m²/g, pore volumes of from about 2.0 to about 3.5 cm³/g, and stability at temperatures up to 2,000°F. in a fluidized bed.

Preferred silica xerogels in accordance with the present invention have a pore diameter distribution wherein above about 70 percent of the cumulative pore volume is within the pore diameter range of 300 to 600 A and a total pore volume of 2.2 to 3.0 cm³/g.

Figure 6:
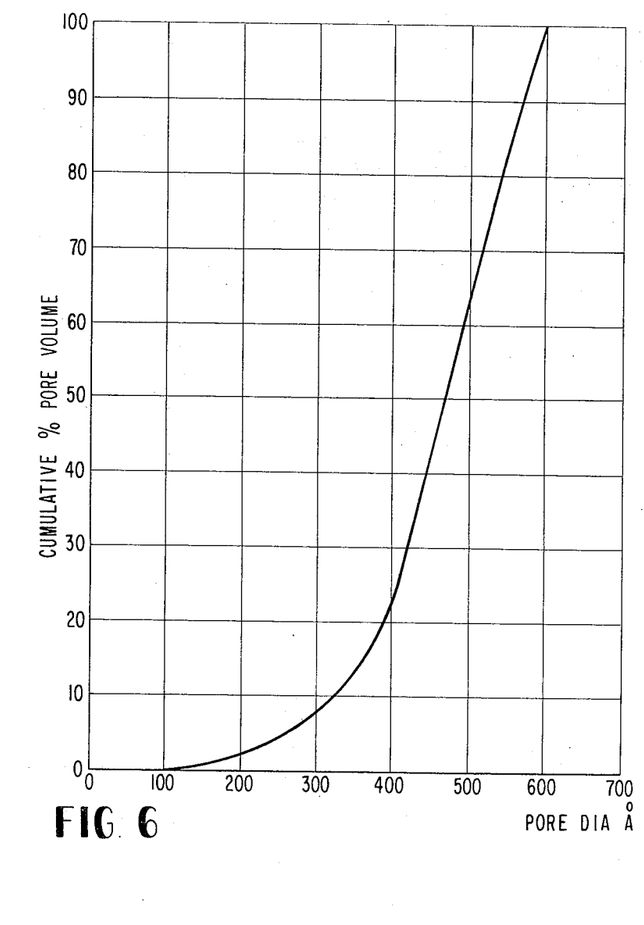
FIG. 6 is a typical pore size distribution chart for the silica xerogels of the present invention.

The properties of the silica xerogels obtained in accordance with the invention and particularly the porosity characteristics are discussed in terms of pore volume (PV), surface area (SA), average pore diameter (Av. PD), where Av. PD = (4PV/SA), and pore size distribution. FIG. 6 is a plot of silica gel pore size distribution versus the pore diameter. Determinations of the values for the various properties are made by a nitrogen absorption-desorption technique well known in the art and described in detail in the literature. For example, descriptions of the nitrogen absorption-desorption procedure for evaluating porosity of silica gels are found in the Journal of the American Chemical Society, Volume 60, Page 309 (1938), "Journal of Catalysis," Volume 2, Page 111 (1955) and elsewhere.

In the following examples, Example I is a description of a preferred method for carrying out the process of the invention to obtain a silica xerogel of the stated characteristics. The remainder of the examples illustrate the criticality of various process conditions or describe suitable alternative procedures for obtaining the silica xerogels.

EXAMPLE I 10,080 g of sodium silicate solution containing 28.7 percent $SiO_2$ and 8.9% of $Na_2O$ was added to 12.720 g of water and cooled to 5°C. under agitation.

11,200 g of $H_2SO_4$ (12.75 wt. percent) was then added as follows:

a. 4,480 g was added at a constant rate over a period of one hour to reach the gel point, and b. the remainder was added over a period of 45 minutes. The final pH of the slurry was 6.2 and the $SiO_2$ content was approximately 8.5 percent.

The slurry at a pH of 6.2 was then heated to 95°C. and held at that pH/temperature for 3 hours. The slurry was washed with a solution of 1,113 g of $NH_4NO_3$ in 45 gallons of water, and then with de-ionized water until the wash liquor titrated or contained less than 20 ppm $Na_2SO_4$ at equilibrium. To illustrate all features of the process, the product was then homogenized. The slurry can also be homogenized prior to washing with $NH_4NO_3$ or can be homogenized after being reslurried in acetone. Homogenization prior to washing (if homogenization is necessary) is most preferred as smaller particles are easier to wash to the required sodium level. Homogenization after acetone treatment is non-preferred due to the extra care required if any flammable vapor, e.g., acetone vapor, is produced.

The product was then reslurried in acetone, a water miscible organic solvent, and washed with acetone until the water in the acetone titrated less than 1.0 percent at equilibrium. The acetone was then distilled off to reduce the acetone content to less than 1 percent by weight.

In a preferred embodiment, for certain end uses, the following optional step can be performed in the process of this invention:

6. Calcining the product from step 5 at a temperature between about 500° and about 1,200°F., preferably at about 1,000°F.. This final calcining/drying removes all traces of the water displacing organic liquid, e.g., acetone. It should be noted that this final calcination/drying at 500°–1,200°F. is generally not considered a catalyst activation (which normally requires higher temperatures) but may in certain instances serve that purpose. However, a specific example of such a calcining/drying is also set out below.

The silica gel obtained was calcined in an oven at 1,000°F. for 4 hours before evaluation. The physical properties of the silica xerogel thus obtained were:

SA = 268 m²/g, PV = 2.52 cm³/g, Av. PD = 365 A. The dried silica gel contained less than 1,000 ppm sodium, based on the total silica gel weight.

Figure 1:
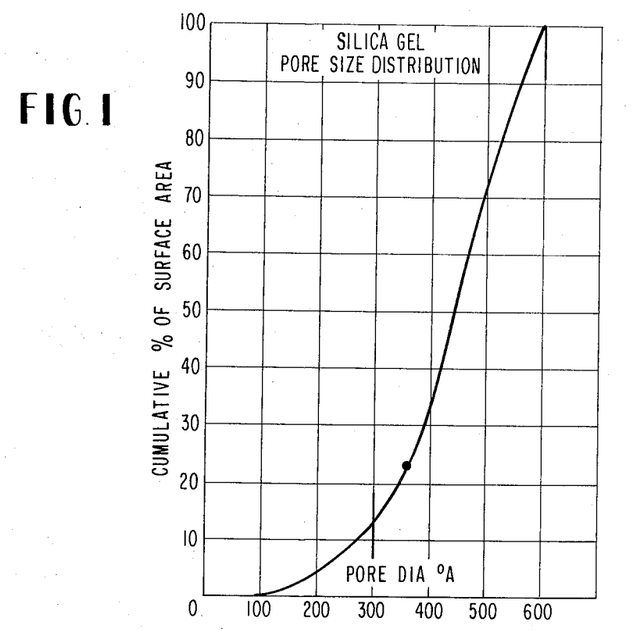
FIG. 1 shows the pore size distribution for the silica xerogel produced by the process of Example I.

Referring to FIG. 1 of the drawings, it will be seen that the major portion of the cumulative surface area of the silica xerogel product is accounted for by gel having a pore size distribution in the narrow range of from 300 to 600 A.

After calcination in a fluidized bed at 1,800°F. for 3 hours to activate the gel for use as a catalyst, the physical properties were unchanged within the limits of analytical error:

SA = 278 m²/g, PV = 2.54 cm³/g, Av. PD = 365 A

Such gels are particularly useful for olefin polymerization. Other activation temperatures may be used.

EXAMPLE II

All of the variables during precipitation, except final $SiO_2$ concentration, were maintained as in Example I. Final $SiO_2$ concentrations of 7 and 10 percent were chosen and FIG. 2 shows the effect of $SiO_2$ concentration on the porosity of the gel just after precipitation.

Figure 2:
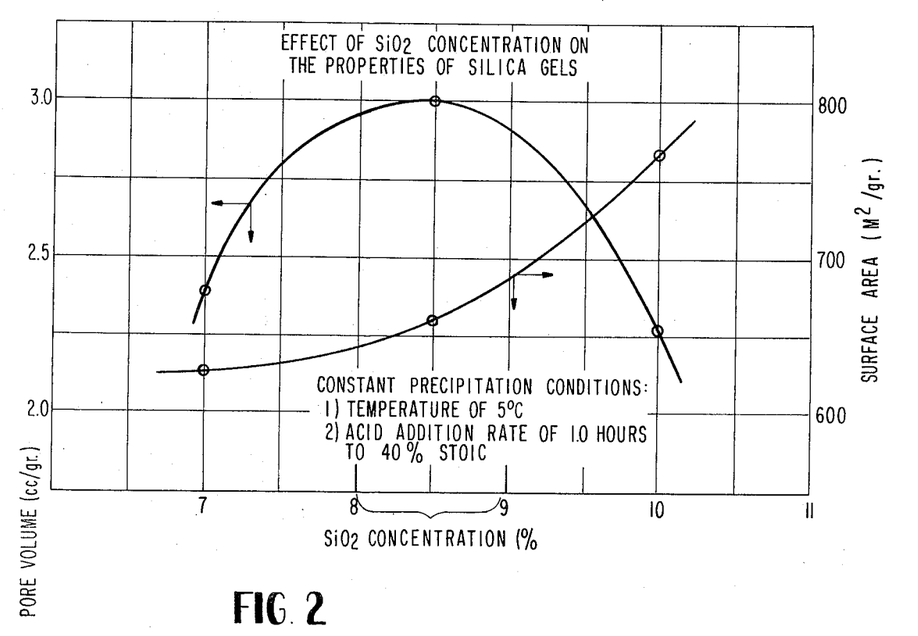
FIG. 2 shows the effect of the final $SiO_2$ concentration in the slurry upon the surface area and pore volume of the product silica xerogel immediately after precipitation (see Example II)

Referring to FIG. 2 of the drawings, it will be seen that relatively lower pore volumes are obtained where the final silica concentration in the slurry is 7 and 10 percent as compared with the pore volume obtained in Example I where an $SiO_2$ concentration of about 8.5 percent was obtained. FIG. 2 also demonstrates that the surface area increases as the $SiO_2$ concentration increases. Thus, in order to get maximum pore volume and at the same time obtain a good surface area level it is preferable to maintain the $SiO_2$ concentration at between about 8 and 9 percent and most preferably at about 8.5 percent.

The preferred sodium silicates used can be represented by the formula $xNa_2 O \cdot y SiO_2$ where $x/y$ is from 1/1 to about 4/1. Corresponding ranges for other water soluble silicates will be easily calculatable to one skilled in the art.

EXAMPLE III

All variables during precipitation, except the acid addition rate, were maintained as in Example I. The initial 40 percent of the stoichiometric acid requirement was added at a constant rate in 0.5 and 2.0 hours as compared to 1.0 hour in Example I.

Figure 3:
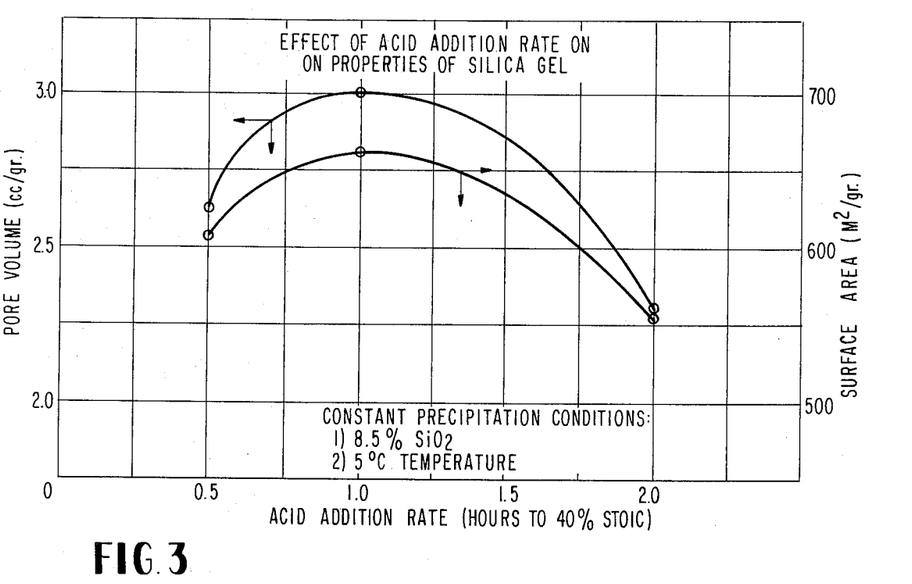
FIG. 3 shows the effect of the rate at which the neutralizing medium is added to the aqueous sodium silicate solution upon the surface area and pore volume of the product silica xerogel immediately after precipitation (see Example III)

Example III clearly illustrates, as shown in FIG. 3 of the drawings, that both pore volume and surface area are dependent upon the rate at which the neutralizing medium, in this case the sulfuric acid, is added to the aqueous silicate solution. It will be seen that optimum pore volume and surface area values are obtained using an addition rate of about 1 hour for 40 percent of the stoichiometric amount, the gel point for this particular system, and that lower values for pore volume and surface areas are obtained where more rapid or slower addition rates are employed.

EXAMPLE IV

Figure 4:
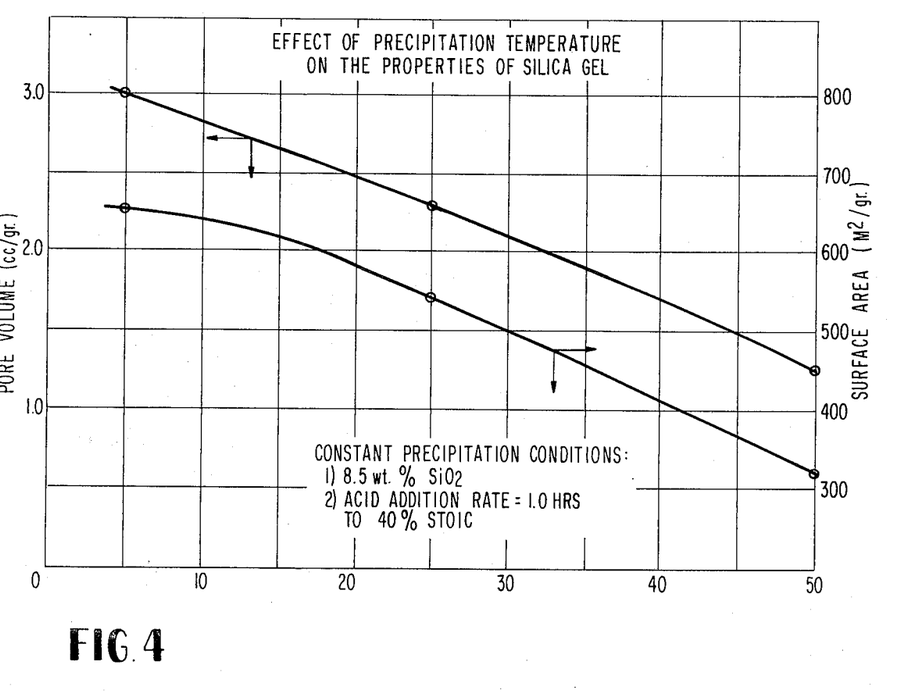
FIG. 4 shows the effect of varying the temperature of precipitation upon the porosity (i.e., pore volume and surface area) of the gel immediately after precipitation.

All variables during precipitation, except temperature, were maintained as in Example I. Temperatures of 25° and 50°C. were used during precipitation. FIG. 4 shows the effect of temperature on the porosity of the gel just after precipitation.

As will be seen by reference to FIG. 4, the pore volume decreases as the precipitation temperature increases. Surface area also tends to decrease with an increase in the precipitation temperature, but this value flattens out at about 5°C. and this is the preferred temperature of precipitation in order to secure optimum values for pore volume and surface area.

EXAMPLE V

In this example all the variables during precipitation were maintained as in Example I, but $CO_2$ was used to neutralize the sodium silicate instead of sulfuric acid. The physical properties of the silica gel were similar to those obtained under Example I.

EXAMPLE VI

All the variables during precipitation were maintained the same as in Example I. After precipitation, the gel was adjusted to a pH of 9.0 by adding NaOH (2-normal) and was heated for one hour at 95°C. The gel was then washed with water and acetone as in Example I before evaluating it.

The properties of the silica gel were as follows:

$SA = 346$ m$^2$/g, $PV = 1.96$ cm$^3$/g, and Av. PD = 226 A.

As will be seen by comparing the properties of the gel obtained in accordance with Example VI with the product of Example I, too high a pH and relatively brief heating during the ageing step results in a loss of pore volume. The pore volume obtained in Example I was 2.52 cm$^3$/g as compared with only 1.96 cm$^3$/g for Example VI.

EXAMPLE VII

In this example, all the variables during precipitation were maintained as in Example I. After precipitation, the gel was adjusted to a pH of 5.0 by adding $H_2SO_4$ (1-normal), and was heated to 95°C. for 4 hours. Samples were taken at various time intervals during the ageing and were washed with water and then with acetone, as in Example I, before evaluation.

Table I shows the influence of the length of the thermal aging period on the porosity of the gel and on pore distribution:

TABLE I

| Time (hours) | SA (M$^2$/g) | PV (cm$^3$/g) | Average PD (A) |
|---|---|---|---|
| 0 | 757 | 2.77 | 147 |
| ½ | 492 | 2.72 | 221 |
| 1 | 394 | 2.90 | 294 |
| 1½ | 355 | 2.76 | 311 |
| 2 | 343 | 2.77 | 323 |
| 4 | 284 | 2.56 | 362 |

As will be seen from the data reported in Table I, the thermal aging of the precipitate should be conducted for a minimum of about 1 hour when the pH of the slurry is 5.0 in order to obtain a silica xerogel product having an average pore diameter in the desired range of from about 300 – 600 A.

EXAMPLE VIII

In this example all the variables during precipitation and heating were maintained the same as in Example I. The gel was then washed as in Example I, but only until the filtrate titrated 100 ppm $Na_2SO_4$. The product was then treated with acetone and evaluated. The physical properties of the gel were substantially the same as were found for the product of Example I. However, when the product was calcined in a fluidized bed at 1,825°F. for 3 hours and evaluated, the properties were as follows:

$SA = 225$ m$^2$/g, $PV = 1.62$ cm$^3$/g, Av. PD = 286 A.

As will be seen from the porosity values of the product obtained in accordance with Example VIII when compared to the product of Example I after calcination in a fluidized bed at 1,800°F, the surface area, pore volume and average pore diameter are all adversely affected by the relatively high level of $Na_2SO_4$ left in the product.

EXAMPLE IX

This example illustrates the interrelationship between the shrinkage of the pore volume of the gel and the water content in the gel subsequent to solvent displacement with the substantially completely water miscible organic solvent of the present invention but prior to the initiation of drying.

The silica gel prior to the solvent displacement step was formed as in Example 1.

The product was re-slurried in acetone and washed with acetone until the water in the acetone titrated a certain percentage.

The acetone was then decanted off and the hydrogel dried. The percent pore volume shrinkage was measured at various water contents prior to drying. Those values were plotted in FIG. 5.

Figure 5:
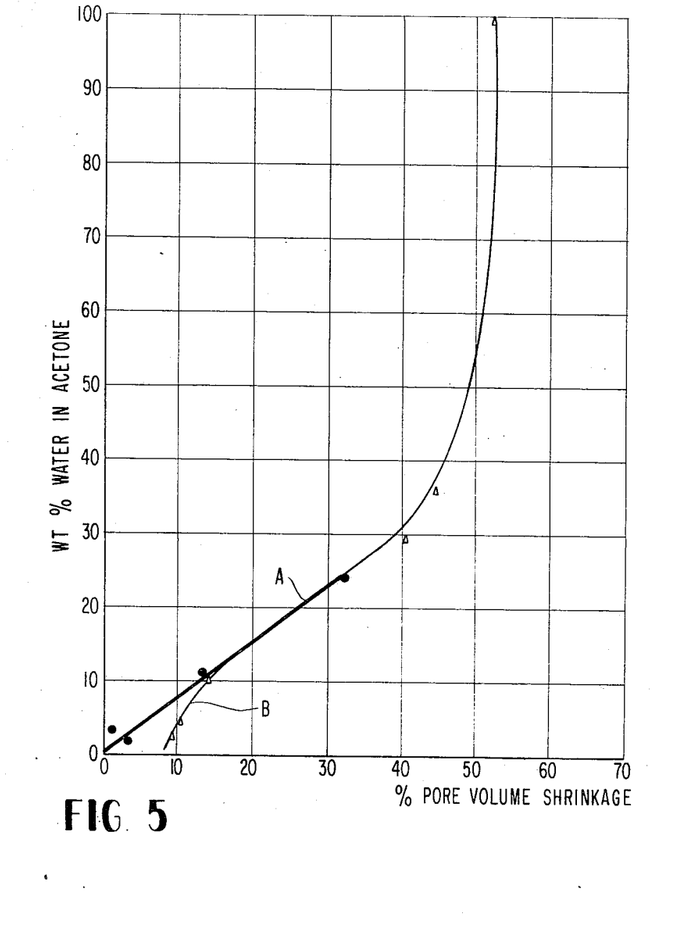
FIG. 5 shows the variation in pore volume shrinkage upon drying versus the water content of the organic solvent from which the gel is dried (see Example IV)

Two methods of investigation were used to derive the data for FIG. 5. One method assured equilibrium conditions of the solvent-water mixture in the pores of the gel with the body of the liquid. The second method hindered equilibrium conditions.

In both methods of investigation, the percent pore volume shrinkage was based on the ultimate pore volume which could be obtained with unlimited solvent washing. For instance, a percent pore volume shrinkage of 10 percent indicates that the pore volume was 10 percent smaller than the ultimate pore volume obtainable.

Referring now to FIG. 5 of the drawings, the weight percent of water which remained in the acetone after solvent displacement with acetone (the amount of water titrated) is plotted against the percent pore volume shrinkage. Line A represents the equilibrium values, whereas line B represents the hindered, or non-equilibrium, values.

Some of the values used to plot the curves are numerically presented below:

Relationship of Percent Water in Solvent Body to the Pore Volume of the Resulting Dried Gel After 2 ½ Hours Agitation (Equilibrium).

| Water by weight | Pore Volume, cc/g | % P.V. Shrinkage |
|---|---|---|
| 24.0 | 1.89 | 32.5 |
| 11.4 | 2.41 | 13.9 |
| 3.5 | 2.76 | 1.4 |
| 1.7 | 2.69 | 3.9 |
| 0 | 2.80 | 0 |

Relationship of Percent Water in Solvent Body to the Pore Volume of the Resulting Dried Gel after about one-half Hour Agitation (Non-equilibrium).

| % Water by weight | Pore Volume, cc/g | % P.V. Shrinkage |
|---|---|---|
| 100.0 | 1.37 | 52.1 |
| 36 | 1.56 | 44.5 |
| 29 | 1.70 | 40.5 |
| 24 (approx.) | 2.16 | 24.5 |
| 10 | 2.18 | 14.0 |
| 4.1 | 2.56 | 10.5 |
| 2.3 | 2.58 | 9.8 |
| 0 | 2.86 | 0 |

The simplest way to displace water from the gel, and the procedure used in this example, is merely to immerse the gel in acetone after decanting all possible water therefrom. Water will be displaced from the gel into the acetone until equilibrium is reached. At equilibrium the water content in the pores of the gel is equal to the water content in the body of the acetone-water, and in dynamic balance therewith.

To remove further amounts of water from the gel, if the equilibrium water percentage in the body of the acetone-water wash denotes an unacceptable percent pore volume shrinkage, it is necessary to upset the equilibrium conditions, and this is most easily done by decanting the first acetone-water wash and replacing this with pure acetone (or at least acetone of a lower water content). The pure acetone displaces additional water from the pores of the gel until a new equilibrium value is reached. The water content in the surrounding body of the acetone-water wash is then determined and the percent pore volume shrinkage which will result can be found. If the shrinkage is too high, the above process is repeated with ever decreasing equilibrium water percentages until an acceptable percent pore volume shrinkage is reached, whereafter washing is discontinued.

The above process is essentially a repeating batch wash. It is preferably conducted under conditions of agitation to insure good contact between the acetone and the gel. A continuous wash could also be used where a stream of acetone is passed over the gel wherein the water content in the acetone after washing is continuously monitored. The batch procedure is much simpler, however, since even in its preferred embodiment one needs only a tank and an agitator with simple discontinuous monitoring equipment to determined when equilibrium is reached.

The equilibrium point for any wash, be it batch or continuous, is easily determined; it is that point at which the water content in the body of the solvent surrounding the gel no longer changes with the passage of time. As a practical matter, this is determined to occur when two successive titrations provide a constant water percentage. If the water content in the surrounding solvent body increases from one measurement to the next, equilibrium conditions have not yet been reached. The spacing of time intervals is not important and depends, obviously, on the accuracy and sensitivity of the measuring equipment used. If the measuring equipment is sensitive enough a constant water content can be determined by very closely spaced measurements. For ordinary industrial operation using standard titration equipment, usually the measurements are about 30 minutes apart.

Nothing significant is gained by washing the gel beyond the time when the equilibrium state is reached, as once the equilibrium state is reached no additional water will be displaced (until, of course, equilibrium conditions are upset by, e.g., introducing fresh acetone to thereby permit the establishment of a new equilibrium level at a lower water content). Usually a washing for at most about 2 hours is sufficient to reach an equilibrium stage in batch-type processing.

By permitting equilibrium to be reached between the water in the pores of the gel and the water in the surrounding body of displacing solvent it is possible to predict the percent pore volume shrinkage upon drying of the solvent from the gel. The percent pore volume shrinkage which is acceptable will vary depending upon the requirements of the gel product. For instance, assuming a 2.8 cm³/g pre-drying pore volume, if one desired a 2.8 cm³/g dried product one would have to wash to substantially zero water. On the other hand, if a final dried pore volume of 2.5 cm³/g was acceptable, one could dry at an equilibrium water percent of about 8 percent and tolerate a 10 percent pore volume shrinkage. Since, however, most users will desire a gel with a dried pore volume of 2.50 – 2.90 cm³/g, one will generally wash to obtain a water content of less than 5 percent, e.g., in the range of 0 to 5 percent or 1 to 5 percent at equilibrium, to thereby obtain a lower than 6 percent pore volume shrinkage. Little is to be gained by permitting large amounts of water to remain prior to drying, and seldom will very high amounts of water, e.g., over about 47 percent, be permitted to remain in ghe gel after solvent displacement. The most preferred water content prior to drying is in the area of about 2 to about 3 percent by weight water in the displacing solvent, e.g., acetone.

Reference to FIG. 5 will enable one to easily determine the permissable water content at equilibrium for any desired percent pore volume shrinkage. Although this plot is in terms of water in acetone, the same data trend is applicable to other substantially completely water miscible displacing solvents, as the critical factor is the water content in the pores of the gel and this factor can be determined on a percent by weight basis no matter what displacing solvent is selected.

From the heretofore offered discussion, it will be clear that it is not mandatory to wash to an equilibrium value. The benefit provided by washing to an equilibrium value is that one can predict the percent pore volume shrinkage in advance of drying, a necessity for practical commercial operation where different runs may be necessary to produce silica gels of differing pore volumes for different consumers.

To summarize, one can predict the permissible amount of water in the gel at drying for any given set of gel formation conditions by the following procedure:

1. wash a first sample of the gel to zero equilibrium water and determine the ultimate dried pore volume;
2. wash further samples to decreasing sequential amounts of water from the highest water content of interest and, at equilibrium between the water in the gel and the water in the surrounding body of displacing solvent, determine the water content in the surrounding body of solvent, dry the gel and measure the pore volume;
3. calculate the percent pore volume shrinkage, i.e., $100 - [(\text{pore volume/ultimate pore volume}) \times 100]$;
4. plot the percent pore volume shrinkage vs. equilibrium water content.

From the above discussion, it is to be clearly understood that the present process is not limited to any maximum percent pore volume shrinkage. On the contrary, in some instances a very high percent pore volume shrinkage will be acceptable, and in others a very low percent pore volume shrinkage must be observed, depending upon end use requirements.

While the invention has been particularly shown and described with reference to a preferred embodiment thereof, it will be understood by those skilled in the art that various changes in form and details may be made therein without departing from the spirit and scope of the invention.

What is claimed is:

1. A method for producing a silica xerogel having a narrow pore diameter distribution primarily within the range of 300 – 600 A, a surface area within the range of 200 – 500 m²/g, a pore volume of from about 2.0 to about 3.5 cm³/g and stability at temperatures up to about 2,000°F comprising:

a. precipitating a silica hydrogel, under conditions of good agitation, by the neutralization of an aqueous alkaline silicate solution to provide a silica hydrogel slurry having an $SiO_2$ concentration of from about 5 to about 12 percent by weight, the pH during precipitation being maintained between pH 3 and pH 8, the temperature during precipitation being maintained at from 0° to about 17°C, and the neutralizing medium being added to the aqueous alkaline silicate solution at a rate such that the gel point of the solution is reached in from about 30 to about 120 minutes, whereafter the remaining amount of the neutralizing medium required to provide an end pH of between pH 3 and pH 8 is added, b. maintaining the hydrogel slurry from step (a) at a pH within the range of from 3 to 8 at a temperature and for a time sufficient to strengthen the hydrogel structure, c. reducing the alkaline material concentration in the product of step (b) by washing the product of step (b) with a liquid which displaces said alkaline material, so that the wash liquor, in equilibrium with the product of step (b), contains less than about 20 ppm of alkaline material expressed as an acid-base salt thereof, d. displacing the water from the product of step (c) by washing the product of step (c) with a water miscible liquid which replaces water and reduces the surface tension in the pores of the gel, and e. drying the product of step (d) to provide the silica xerogel.

2. The method of claim 1 further comprising:

f. calcining the product of step (e).

3. The method of claim 1 wherein the precipitation of silica xerogel in step (a) is accomplished by neutralization of the aqueous solution of an alkaline silicate with an agent selected from the group consisting of a strong acid, a weak acid, and an ion-exchange resin.

4. The method of claim 1 wherein the alkaline silicate is an alkali metal silicate and the temperature during step (b) is maintained above the temperature during step (a).

5. The method of claim 1 wherein the $SiO_2$ concentration in the hydrogel slurry of step (a) is from about 8 to about 9 percent by weight.

6. The method of claim 1 wherein the temperature during neutralization step (a) is from about 0° to about 10°C..

7. The method of claim 1 wherein the pH of the hydrogel slurry during step (a) is maintained at from about 5 to about 7.

8. The method of claim 1 wherein the pH of the hydrogel slurry in step (b) is from about 4 to about 7.

9. The method of claim 1 wherein the temperature of the hydrogel slurry during step (b) is maintained at about 50° to about 100°C..

10. The method of claim 1 wherein the time of step (b) is about 1 to about 6 hours.

11. The method of claim 1 wherein the reduction of concentration of alkaline ions is accomplished by washing with a solution of displacing salts selected from the group consisting of ammonium chloride, ammonium nitrate and mixtures thereof.

12. The method of claim 1 wherein step (c) is accomplished by washing with a solution of a mineral acid selected from the group consisting of HCl, $H_2SO_4$ and $HNO_3$.

13. The method of claim 1 wherein the organic liquid in step (d) is selected from the group consisting of lower aliphatic alcohols, acetone, and mixtures thereof.

14. The method of claim 1 wherein up to about 40 percent of the neutralizing medium is added in from about 30 to about 120 minutes and wherein the remaining neutralizing medium required to provide an end pH of 3 to 8 is added in about 20 to about 90 minutes more.

15. The method of claim 1 where the xerogel water content subsequent to displacement with said organic liquid but prior to drying is at least 1 percent by weight water but no greater than about 6 percent by weight water measured as the equilibrium water content in the displacing organic liquid.

16. The method of claim 15 wherein said water content is about 2 to about 3 percent by weight.

17. The method of claim 1 where step (b) is conducted under agitation.

18. The method of claim 1 where the silicate is a sodium silicate of the formula $xNa_2O \cdot ySiO_2$ wherein $y/x$ is from 1/1 to about 4/1.

19. The method of claim 1 further comprising comminuting the hydrogel after step (b) but prior to step (e).

20. A method for producing a silica xerogel having a narrow pore diameter distribution primarily within the range of from 300 to 600 A, a surface area within the range of from 200 to 500 m²/g, a pore volume of from 2.2 to 3.0 cm³/g and stability at temperatures up to about 2,000° F. comprising:
   a. precipitating a silica hydrogel by neutralization of an aqueous solution of a sodium or potassium silicate to provide a silica hydrogel slurry having an $SiO_2$ concentration of from about 8 to about 9 percent by weight while maintaining the pH at from about 5 to about 7 and maintaining the temperature at from about 0° C. to about 10° C., wherein the neutralizing medium is selected from the group consisting of a strong acid, a weak acid, and an ion-exchange resin and is added to the aqueous sodium or potassium silicate solution at a rate of up to about 40 percent of the necessary amount in from about 30 to about 120 minutes, and wherein the remaining amount of neutralizing medium necessary to provide an end pH of from about 5 to about 7 is added in a period of time of at least about 20 minutes more, precipitation being under conditions of good agitation,
   b. heating the product of step (a) at a temperature greater than the temperature of step (a) and at a pH of from about 5 to about 7 for at least about 1 hour, while agitating the product of step (a),
   c. reducing the sodium or potassium concentration of the product of step (b) by washing the product of step (b) with a liquid which displaces said sodium or potassium until the resulting wash liquor, at equilibrium with the product of step (b), contains less than about 20 ppm sodium or potassium, expressed as an acid-base salt thereof,
   d. displacing the water from the product of step (c) by replacement of the water with a water miscible organic liquid which reduces the surface tension within the pores of the gel to provide a product with a water content of from about 1 to 6 percent by weight measured as the water content in the displacing organic liquid, and
   e. drying the product of step (d) to remove the organic liquid and water and provide said silica xerogel.

21. The process of claim 20 additionally comprising:

f. calcining the product of step (e).

22. The method of claim 20 wherein the reduction of concentration of sodium or potassium ions is accomplished by washing with a solution of displacing salts selected from the group consisting of ammonium chloride, ammonium nitrate and mixtures thereof.

23. The method of claim 20 wherein step (c) is accomplished by washing with a solution of a mineral acid selected from the group consisting of HCl, $H_2SO_4$ and $HNO_3$.

24. The method of claim 20 wherein the organic liquid in step (d) is selected from the group consisting of lower aliphatic alcohols, acetone, and mixtures thereof.

25. The process of claim 20 wherein said water content is about 2 to about 3 percent by weight.

26. The method of claim 20 further comprising comminuting the hydrogel after step (d) but prior to step (e).

27. The method of claim 26 where the temperature of step (b) is from about 50° to about 100° C.

28. The method of claim 10 wherein the time of step (b) is from about 2 to about 4 hours.

29. The method of claim 20 wherein the time of step (b) is from about 1 to about 6 hours.

30. The method of claim 29 wherein the time of step (b) is from about 2 to about 4 hours.

* * * * *